United States Patent Office 3,154,479
Patented Oct. 27, 1964

3,154,479
PROCESS FOR IMPROVING THE PROPERTIES OF SYNTHETIC FIBRES, FABRICS, FILMS AND MOULDED ARTICLES BY IRRADIATION WITH RADIOACTIVE RAYS
Tadashi Muroi, Shunji Onishi, and Satoshi Morimoto, Tokyo, and Aizo Yamauchi, Totsukaku, Yokohamashi, Japan, assignors to Agency of Industrial Science & Technology, Chiyoda-ku, Tokyo, Japan, a Japanese government office
No Drawing. Filed Mar. 25, 1959, Ser. No. 801,685
Claims priority, application Japan, Apr. 28, 1958, 33/11,631; Oct. 2, 1958, 33/28,061; Nov. 17, 1958, 33/32,620; Mar. 6, 1959, 34/6,732
1 Claim. (Cl. 204—154)

The present invention relates to a process for improving the properties of synthetic fibres, fabrics, films and moulded articles by the irradiation of radioactive rays, in particularly to a process for improving the properties, especially the dyeability and hygroscopicity, of synthetic fibres, fabrics, films and moulded articles made of polyvinyl chloride, polyethylene, polypropylene, polystyrene, polyacrylonitrile, polyvinyl alcohol, polyvinylidene chloride, polytetrafluoroethylene, polyester, polyurethane and polyamide high polymers by the irradiation of radioactive rays.

In general, the dyeability and hygroscopicity of synthetic fibres, fabrics, films and moulded articles are remarkably inferior to those of natural and artificial fibres, fabrics, films and moulded articles. It is said that this advantage is because the high polymers constituting such synthetic fibres, fabrics, films and moulded articles have no affinitive radical corresponding to such dyeability and hygroscopicity or because the molecules of dye and water can hardly penetrate and diffuse due to the physical construction of the synthetic fibres, fabrics, films and moulded articles. Although the process for introducing said affinitive radical to said high polymers by utilizing a chemical reaction has been hitherto proposed in order to improve such disadvantages of dyeability and hygroscopicity, these high polymers are so chemically stable as to hard to be subjected to the chemical reaction. Therefore, the introduction into the high polymers of affinitive radical by such process is very difficult. There is also a treating process by the formation of a so-called "graft-copolymer" wherein a vinyl monomer with said affinitive radical is polymerized by utilizing a radical produced on the high polymer constituting synthetic fibres, fabrics, films and moulded articles by irradiation of radioactive rays. In such process, the radical chain polymerization of the vinyl monomer starting from the molecule of high polymer constituting the synthetic fibres, fabrics, films and moulded articles will take place.

We have now found that the dyeability and hygroscopicity of the synthetic fibres, fabrics, films and moulded articles can be improved by irradiation of radioactive rays to them in the presence of monomers of three membered heterocyclic compounds represented by the general formula;

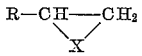

wherein R stands for hydrogen atom or alkyl radical and X stands for oxygen atom, sulfur atom or N—R' radical wherein R' is hydrogen atom or alkyl radical, and their homologues and derivatives, or by irradiation with radioactive rays to them and then heating them together with the monomers of the above three membered heterocyclic compounds and their homologues and derivatives.

According to the present invention, therefore, we provide a process for improving the properties of synthetic fibres, fabrics, films and moulded articles characterized in that the sythetic fibers, fabrics, films and moulded articles are irradiated with radioactive rays in the presence of monomers of three membered heterocyclic compounds represented by the general formula;

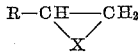

wherein R stands for hydrogen atom or alkyl radical and X stands for oxygen atom, sulfur atom or N—R' radical wherein R' is hydrogen atom or alkyl radical, and their homologues and derivatives.

According to the further feature of the present invention, we provide a process for improving the properties of synthetic fibers, fabrics, films and moulded articles by irradiation with radioactive rays characterized in that the synthetic fibers, fabrics, films and moulded articles are firstly irradiated with radioactive rays and then heating them together with the monomers of the above mentioned three membered heterocyclic compounds and their homologues and derivatives.

According to the present invention, it is considered that the improvement of dyeability and hygroscopicity of the synthetic fibres, fabrics, films and moulded articles can be obtained because of that high polymers which constitutes the synthetic fibres, fabrics, films and moulded articles are subjected to the action of irradiation of radioactive rays to form the reaction product of the high polymers and the three membered heterocyclic compounds on the synthetic fibres, fabrics, films and moulded articles.

As example of the three membered heterocyclic compounds which may be used in the process of this invention, there are mentioned ethylene oxide, ethylene sulfide and ethylene imine. Examples of the homologues thereof are propylene oxide and propylene sulfide. As examples of the derivatives thereof, there are mentioned epichlorhydrin, diphenylmethane-N,N'-diethyleneurea, 2,4,6-triethyleneimine-1,3,5-triazine and polymethylene-N,N'-bisethyleneurea.

In the process of this invention, the three membered heterocyclic compounds and their homologues and derivatives may be as such or used as the solution of them in suitable medium, for example water and methanol.

The process of this invention may be carried out under atmospheric, superatmospheric or subatmospheric pressures, and also may be carried out in any atmosphere, such as air, inert gases or non-air atmospheres. The temperature of which the process of this invention may be carried out are normal, higher or lower temperatures. It is preferable that the amount of irradiation of radioactive rays in the process of this invention is more than $10^4$ roentgens.

The present invention is illustrated, but not limited by the following examples.

*Example 1*

A previously refined polyvinyl chloride, polyethylene and polyethylene terephthalate fibres were respectively co-existed in test tubes containing ethylene imine (B.P. 55–56° C.) distilled from an aqueous alkaline solution. The polyethylene and polyethylene terephthalate fibres were maintained in fibrous state, but the polyvinyl chloride fibres were remarkably swelled. Cork plugs were applied to the each test tubes, the contents of the each test tubes were irradiated with gamma rays at a rate of 1.4×10³ roentgens/hour in a total amount of irradiation of 2.1×10⁵ roentgens by using a ray source of cobalt 60 at the room temperature. The contents were respectively then taken out, thrown into water, washed and extracted and washed with hot water at about 60° C. until there was no decrease of the amount. After they were then respectively extracted with methanol for 10 hours by using a Soxhlet's extractor, the weight increase was determined. Any decrease of the amount by the extraction with methanol was hardly seen. Weight increases of 8.9% in the polyvinyl chloride fibres, 1.8% in the polyethylene fibres and 0.6% in the polyethylene terephthalate fibres were obtained. The thus treated fibres showed a dyeability with such acidic dyes as Acid Violet 4BN and Acid Orange II.

*Example 2*

When polyvinyl chloride fibres were soaked in a 3% aqueous solution of ethylene imine in 50 times amount of fibres to be treated, irradiated with a total amount of irradiation of $3.2 \times 10^5$ roentgens at the same rate as described in the Example 1 and then subjected to the same operations as described in the Example 1, the weight increase was 3.1% and the thus treated fibres had a dyeability for acidic dyes.

*Example 3*

When polyvinyl alcohol fibres were soaked in the same aqueous solution of ethylene imine as described in Example 2, irradiated with a total amount of irradiation of $5.1 \times 10^5$ roentgens at the same rate as described in the Example 1 and then subjected to the same operations as described in the Example 1, a weight increase of 3.3% was seen and the thus treated fibres had a dyeability for acidic dyes.

*Example 4*

After high pressure process polyethylene fibres were put in an air-tight container made of stainless steel and cooled with ice, ethylene oxide was added thereto. The container was sealed under the normal pressure. The contents of the container were irradiated from outside with more than $10^4$ roentgens of gamma rays. As a result, a weight increase of 0.4% was seen and the dyeability of the fibres for direct dyes improved.

*Example 5*

Acrylonitrile fibres were put in a pressure-proof glass tube. While they were being cooled with ice, ethylene oxide was added thereto. As a result of irradiation of the fibres with $2 \times 10^5$ roentgens, a weight increase of 1% was seen. The thus treated fibres had an improved dyeability for direct dyes.

*Example 6*

Low pressure process polyethylene fibres were put in a test tube together with epichlorhydrin. When the contents of the test tube were irradiated with $6 \times 10^5$ roentgens of gamma rays, a weight increase of 0.4% was obtained.

When polyacrylonitrile fibres were treated in the same manner, a weight increase of 1.2% was obtained.

*Example 7*

Polyvinyl chloride fibres were put in a container made of glass and cooled by a Dry Ice-acetone coolant. A methanol solution of propylene sulfide was added thereto. While the contents of the container were being cooled, the air in the container was exhausted by means of a vacuum pump. The container was sealed by fusing. The contents of container were then irradiated from outside with $1 \times 10^6$ roentgens of gamma rays. As a result, a weight increase of 1.2% was obtained and the dyeability for direct dyes was seen to have improved.

*Example 8*

Polypropylene fibres were put in a container made of glass. Ethylene sulfide was added thereto. While the contents were being cooled with an acetone-Dry Ice coolant, the air in the container was exhausted. The container was sealed by fusing. The contents of the container were then irradiated with $6 \times 10^5$ roentgens of gamma rays. As a result, a weight increase of 2.5% was obtained. The improvement of the dyeability for sulfide dyes was seen.

*Example 9*

Vinyl chloride fibres were put in one of two glass test tubes connected in the form of H with each other through a horizontal glass tube. A methanol solution of ethylene sulfide was put in the other of the two glass tubes. While the contents of the glass tubes were being cooled with a acetone-Dry Ice coolant, the air in the tubes was exhausted and the tubes were sealed by fusing. While the ethylene sulfide enclosing part was covered with lead bricks, the fibres were irradiated with $6 \times 10^5$ roentgens of gamma rays. After the irradiation, the ethylene sulfide part was warmed and the ethylene sulfide solution was moved to the fibre side. Heating was further continued at 50° C. for 4 hours. The fibres were then taken out, washed with methanol and dried. As a result, a weight increase increase of 1.0% was obtained.

It will be appreciated that although the above examples have been described with respect to the synthetic fibres, the process of this invention can be applied to the synthetic fabrics, films and moulded articles to give similar effects. After the process of this invention has carried out, the dyeing may be carried out by a suitable dyeing method such as dipping, pattern-dyeing and printing.

What we claim is:

A process for improving the properties of synthetic fibres, fabrics, films and moulded articles made of a polymer selected from the group consisting of polyvinyl chloride, polyethylene, polypropylene, polystyrene, polyacrylonitrile, polyvinyl alcohol, polyvinylidene chloride and polytetrafluoroethylene high polymers comprising irradiating said articles with high-energy ionizing radioactive rays of a total dosage of about $10^4$ to about $10^6$ roentgens in the presence of a monomer comprising a three membered heterocyclic compound represented by the general formula:

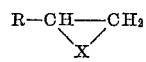

wherein R is one of the group consisting of hydrogen atoms and alkyl radicals and X is selected from the group consisting of oxygen atoms, sulfur atoms and N—R' radicals wherein R' is selected from the group consisting of hydrogen atoms and alkyl radicals.

References Cited by the Examiner

UNITED STATES PATENTS

| | | | |
|---|---|---|---|
| 2,261,294 | 11/41 | Schlack | 8—100 |
| 2,863,812 | 12/58 | Graham. | |
| 2,903,381 | 9/59 | Schroeder | 8—100 |
| 2,926,126 | 2/60 | Graham et al. | |
| 2,940,869 | 6/60 | Graham. | |
| 2,959,531 | 11/60 | Wheelock. | |
| 2,964,454 | 12/60 | Findley. | |
| 3,027,311 | 3/62 | Levine et al. | |

OTHER REFERENCES

Ballantine et al.: "Brookhaven National Laboratory Report No. 414," pages 1–14, October 1956.

Pinner et al.: "Plastics," pages 27–30, January 1958.

JOHN H. MACK, *Primary Examiner.*

JOHN R. SPECK, JOSEPH REBOLD, MURRAY TILLMAN, *Examiners.*